United States Patent [19]
Krosch et al.

[11] Patent Number: 5,525,278
[45] Date of Patent: Jun. 11, 1996

[54] RECYCLING PROCESS AND APPARATUS FOR RIGID POLYURETHANE FOAM

[75] Inventors: Karl Krosch; Barthel Krosch; Michael Krosch, all of Zülpich; Robert Ecker, Vettweiss, all of Germany

[73] Assignee: Hecker und Krosch GmbH & Co. KG, Zülpich, Germany

[21] Appl. No.: 157,088

[22] PCT Filed: Mar. 12, 1993

[86] PCT No.: PCT/DE93/00225

§ 371 Date: Nov. 30, 1993

§ 102(e) Date: Nov. 30, 1993

[87] PCT Pub. No.: WO93/19917

PCT Pub. Date: Oct. 14, 1993

[30] Foreign Application Priority Data

Mar. 30, 1992 [DE] Germany ............ 42 10 323.1
Mar. 2, 1993 [DE] Germany ............ 43 06 447.7
Mar. 4, 1993 [DE] Germany ............ 43 06 626.7

[51] Int. Cl.⁶ .............. B29C 67/20; B29C 31/00; B29C 33/00; B29C 43/00
[52] U.S. Cl. .............. 264/45.3; 264/109; 264/DIG. 7; 264/DIG. 69; 425/4 R; 425/202; 425/209; 425/256; 425/259; 425/345; 425/348 R; 425/812; 425/817 R; 425/DIG. 108; 425/DIG. 110; 425/DIG. 246; 425/DIG. 247
[58] Field of Search .............. 264/45.3, 109, 264/115, DIG. 7, DIG. 69; 425/4 R, 817 R, 202, 209, 256, 259, 345, 348 R, 812, DIG. 108, DIG. 110, DIG. 246, DIG. 247

[56] References Cited

U.S. PATENT DOCUMENTS

| | | | |
|---|---|---|---|
| 1,696,900 | 1/1929 | Bailey | 425/DIG. 108 |
| 3,354,578 | 11/1967 | Ryan | 264/DIG. 7 |
| 3,401,128 | 9/1968 | Terry | 264/DIG. 7 |
| 3,452,122 | 6/1969 | Stern et al. | 264/DIG. 7 |
| 4,243,617 | 1/1981 | Burge | 425/348 R |
| 4,591,469 | 5/1986 | Buchanan et al. | 264/109 |
| 4,666,646 | 5/1987 | Chang | 264/109 |
| 4,874,564 | 10/1989 | Sudani et al. | 425/DIG. 110 |
| 4,968,463 | 11/1990 | Levasseur | 264/DIG. 69 |
| 5,075,057 | 12/1991 | Hoedl | 264/DIG. 69 |
| 5,185,380 | 2/1993 | Diessel et al. | 264/DIG. 69 |
| 5,204,040 | 4/1993 | Chang | 264/DIG. 7 |
| 5,292,462 | 3/1994 | Nestle | 264/109 |

FOREIGN PATENT DOCUMENTS

| | | |
|---|---|---|
| 2029622 | 10/1970 | France . |
| 114927 | 9/1975 | Germany . |
| 2439672 | 3/1976 | Germany . |
| 144885 | 11/1980 | Germany . |
| 3530754 | 3/1987 | Germany . |
| 3844664 | 5/1991 | Germany . |
| 5723636 | 2/1982 | Japan . |
| 57-56218 | 4/1982 | Japan . |
| 62-104865 | 5/1987 | Japan . |
| 2116572 | 9/1983 | United Kingdom . |

*Primary Examiner*—John Kim
*Attorney, Agent, or Firm*—James Creighton Wray

[57] ABSTRACT

The recycling of used polyurethane foam is made possible by a process in which the starting material is first dried to a moisture content of 2 to 4% and is then filled into a multi-part mold (16, 17, 18) that defines the molded part (32). The parts of the mold (16, 17, 18) are then, with generation of the necessary compression pressure of below 20 N/mm², pressed together and locked. These molds (16, 17, 18) that are subject to the compression pressure are heated in a tunnel furnace (20) so that the molding material reaches a temperature of approximately 130° C. After a predefined holding time, the molds (16, 17, 18) can be opened under pressure and the molded parts (32) can be removed. Molded parts (32) with a thickness of 42 mm and of corresponding size have been produced successfully with this process. Instead of the molds (16, 17, 18), it is also possible that a two-part tool is used. Also possible is the use of turntables (14, 41, 44), whereby the pressing and holding time can be shortened by adding an accelerator. The process, which comprises only one pressing step, enables an approximately continuous operation.

31 Claims, 4 Drawing Sheets

RECYCLING PROCESS AND APPARATUS FOR RIGID POLYURETHANE FOAM

BACKGROUND OF THE INVENTION

The invention relates to a process for the recycling of rigid polyurethane foam and the production of molded pieces of pretreated rigid foam by comminuting the starting product to <10 mm, mixing it with a binder (polyurethane adhesive) and pressing it at temperatures between 100° and 200° C. and a pressure of up to 20N/mm². The invention relates also to an installation for processing the rigid polyurethane foam, comprising a mill, a sizing screen, a mixing device, and a press.

In a known process of this type (Japanese Application 57-34926 and French Application 20 29 622), material for packaging and insulation purposes is produced from the particles of a rigid polyurethane foam and a binder. These particles are comminuted suitably to below 20 or 10 mm, mixed with the binder, and are then compressed in a heated press, and the boards thus obtained are used as a thermally insulating material. These boards are, however, not elastic and break-resistant enough to use as boards per se, but at most can be used as a substitute for rock wool or similar mats. East German Patent 144 885 introduces a process for producing molded pieces of polyurethane foam waste wherein comminuted polyurethane foam waste with a particle size between 0.5 mm and 10 mm diameter are moistened with a rubber solution. This starting material is used to produce boards, coatings, and other molded pieces. It is also known (from German Patent 24 39 672) that flexible floor covering boards are produced by plastifying shredded synthetic leather waste and other comminuted materials of thermoplastic synthetic material in an extruder and to produce from the material processed in this manner, by way of a press device, a web that is then cut into individual boards. In another known process, non-slipping coating material is produced from a mixture of integral foam granulate, flakes, and soft polyurethane foam in a heated press at approximately 190° to 200° C. (East German Patent 114 927). The soft polyurethane foam flakes hereby function as a binder.

Finally, German Patent 38 44 664 reveals that the material is first compressed with low pressure in a two-step process from suitably comminuted polyurethane foam and a binder, and that this material is then finished by compression in a second step with a higher pressure (4N/mm²). The boards manufactured in this manner supposedly are superior to particle boards in terms of elasticity and breaking resistance. A disadvantage, however, is that this process essentially presupposed clean production waste. It was also found that comminution to 20 mm and below, i.e. to approximately 10 mm, is insufficient for performing the process without any problems. It is particularly disadvantageous that the process requires discontinuous steps, since the press must be stopped for some time after reaching the end of the compression path before the pressure can be released and the material is unmolded. The output of an installation working according to this described process is thus limited.

SUMMARY OF THE INVENTION

The invention is therefore based on the task of creating a process and an installation with which PU foam recycling material with contaminations can be processed in a safe and largely continuous manner.

According to the invention, the task is solved in that the starting product is dried to 2 to 4% residual moisture and is then filled into a multi-part mold defining the molded piece, then the molds are pressed together and locked by generating the compression pressure, the molded pieces are hereby compressed while maintaining ventilation passages, the molds are then heated externally until the molding material reaches a temperature of 80° to 180° C. and are kept close for a predefined holding time, and the molded pieces are then unmolded.

The process of the invention first provides drying to 2 to 4% or, depending on the material, up to 10%, in order to prevent tensile forces due to the evaporation of the water during the pressing process and to simultaneously ensure even heat conduction within the molded piece. Should the moisture content of the starting product be below 2 to 4%, a suitable moistening would be required, since only in this case can a thorough heating of the pressed piece be ensured. At the same time, there is a tendency for isocyanate to react with air humidity or moisture, which ensures the hardening process. Then the suitably pretreated starting product is filled into a multi-part mold that itself acts as a press, since the molded parts can be pressed against each other and then can be locked, so that the pressure generated by the pressing together of the two molded parts is maintained. This entire process is first performed without heating, but with the mold itself being warm. The molded material reaches its final temperature only when the mold is heated externally, so that a substantial continuity of the process of the invention is made possible. The individual molds filled with the molding material, for example, can be transported through a furnace so that a certain continuity is achieved and ensured. After a suitable holding time following the conclusion of the heating, the molds can then be removed from the heating zone, they can be opened, and the molded pieces can then be unmolded. The molded pieces created in this manner are suitable for a large variety of applications; it is possible, for example, to produce cable drums or the individual molded parts needed for the manufacture of cable drums, which can then be assembled into cable drums. Such cable drums are subject to significant stress and are able to absorb this stress without problems, since the molded parts manufactured in this manner have high stability and elasticity values. Boards should also be considered molded pieces.

An advantageous binding capability is achieved if the starting product is comminuted to <2 to 4 mm while maintaining a dust portion of approximately 30%, if it has 8 to 40 g/sec of isocyanate in the form of a spray mist added, and if it is then processed into molded pieces. It was found that with such a mixture, a favorable particle distribution is achieved that ensures accordingly good stability values. In contrast, higher dust content results in a loss of stability of the hot molded piece that has not yet been unmolded and is significantly brittle. Higher contents of larger particles have the inherent risk that breaks can occur at the surface of the molded piece, again resulting in potential problems. Since the starting product first must be compressed without simultaneous heating, it is advantageous if the compression pressure within the mold is continuously brought to max. 20N/mm², whereby this high specific pressure is exploited exclusively for reaching the press path and for locking. It does, however, ensure that the pressure necessary inside the mold for joining together the molded piece is made certain. A favorably acting binder is added to the mixture in the form of the isocyanate. Suitable for this are liquid, solvent-free diphenylmethane-4,4'-diisocyanates with isomers and higher functional homologs. The amount depends on the volume of the mixture. This isocyanate or isocyanate mixture is stored at a temperature of 25° to 30° C., at least at room temperature, and is sprayed on in a suitable manner. The molds are then also unlocked under pressure.

To ensure that the material is then heated to a sufficiently high temperature, it has been provided that the molded material is heated in the mold, e.g. when passing through a furnace, to approximately 130° C. The mold is heated by being passed through a tunnel furnace that is divided into at least two zones in order to shorten the passage times. The mold is first heated as fast as possible to the desired temperature, whereby a fast heat transfer requires that the furnace temperature is clearly above the desired value for the mold. The furnace temperature should be above the desired value, especially if a third zone is provided inside the tunnel furnace. Once the mold has the required temperature, the holding time must also be considered. In this context it can be assumed that, depending on the heat capacity of the mold, a limited time at the end of the holding time also can be spent outside the heated zone. The holding time is preferably 10–20 min.

The application of this process unexpectedly makes it possible to solve a large disposal problem by mixing aggregates such as PVC granulate or even cable trash or cellulose in the form of paper or cardboard, with a content up to 80%, to the starting product during comminution. In spite of the metal components, the compressibility and stability of the end products is not significantly affected in a negative manner. Incorporation of the waste materials is possible, whereby cellulose, preferably in the form of paper, is added to the rigid foam, mixed with it, and is then processed further. Surprisingly, this material (cellulose) is incorporated completely into the mixture without requiring a change in the procedure.

In cases where a suitable tunnel furnace or similar heating device suitable for continuous heating of the molded pieces or molds is not available, it is advantageous if the starting product is dried to a residual moisture content of 2 to 4% or more, if it is then compressed in a compression phase with 2.5 to 5N/mm$^2$, and if the pressure is then maintained for a predefined holding time during which the two-part tool is heated to 80° to 180° C., whereupon the molded pieces are unmolded. Although such a process has the disadvantage that, due to the imperative holding time in the actual press, only a discontinuous process can be performed, it is nevertheless ensured that a good processing and safe ventilation of the molded pieces is achieved. It is advantageous in this case if the compression phase and holding time are calculated according to the formula t(min)=s(mm)/2 or more, whereby s is the greatest thickness of the molded piece. It also must be taken into account that the compression time is a factor in the dimensional stability and distortion of the molded piece: if the time is too short, the tendency to distort becomes greater. The given compression of 2.5 to 5N/mm$^2$ as a specific pressure is usually sufficient, especially if the surface of the molded piece can be loaded uniformly, something which is possible in the process according to the invention by heating the tool [and] correspondingly subjecting the tool to pressure. According to the invention, typical compression ratios hereby are in the range from 1:6 to 1:12 to which the starting product is compressed. Depending on the material it may be practical to choose the pressure so that the press path is reached gradually but more clearly before the total time has passed. Then the compression is locked down mechanically or hydraulically by way of the reached press path, i.e. until the end of the holding time. To ensure a release of the molded piece from the form or the tool, the invention provides that the tool is equipped with a roughened surface and is sprayed with a suitable releasing agent prior to being inserted into the mold.

To shorten the individual cycle times, it is provided that a catalyst is added after the mixing, or simultaneously. It is useful that the mixture is filled simultaneously and in a predefinable and tuned cycle into several molds that are integrated into turntables, that the molds are then subjected to pressure, and after a waiting time of one to several minutes the molded part can then be unmolded, and the mold can be cleaned. The compression and heating process can be significantly shortened by the corresponding mixing process, the previous comminution to below 5 mm, and the addition of catalysts, preferably suitable accelerators. Hereby the moisture in the mixed products has a positive effect, so that it is also conceivable to specifically increase the mentioned drying limit of up to 4%. Hereby it is also possible to add material that was not pretreated, i.e. more or less undried material, since the catalyst then can act faster and more uniformly. In this process, it is also advantageous that an improved quality is achieved with the added catalyst, i.e. molded parts or boards that are characterized by high elasticity, as well as breaking resistance. It is also advantageous that the output can be significantly increased through the possibility of using several turntables arranged parallel to each other. The mold is subjected to a pressure of 3–10N/mm$^2$. A binder and catalyst are added after being preheated. In the installation for performing the process of the invention, the mixing device is preceded by a drying device, or the mixing device is equipped with a dryer. The press is furthermore constructed as a two- or multi-part mold whose parts can be locked against each other, and where the molds are constructed so as to be transportable through and heatable in a tunnel furnace and equipped with ventilation slots or bores. With such an installation it is possible to operate almost continuously, although the individual steps naturally must be performed separately. But especially since the time-consuming drying is possible without any replacement of the mold containers, if the tunnel furnace is constructed correspondingly, the advantageous, uniform flow of the overall process is ensured, especially since the degree of dryness can also be changed. The process can even be realized with a residual moisture of 10%. The ventilation prevents tearing and blistering, etc., as well as damage that could influence the stability of the final product.

According to a useful design of the installation, the molds are arranged on a turntable that also extends through the tunnel furnace and that exhibit spacers and self-braking rollers. This makes it possible to guide the containers in the tunnel furnace in very short intervals and to keep them, so that they are passed uniformly through the tunnel furnace while they are kept spaced on the remaining carousel according to the necessary partial steps without necessarily requiring suitable holding devices. This makes it possible to operate the entire installation with little personnel, which is advantageous especially in view of today's high operating costs.

This modified process is performed on an installation where the mixing device is preceded or followed by an adjustable dryer, or where the mixing device is equipped with an integrated dryer and where the press consists of a bottom part with contour elements and attachment, as well as an upper part that can be inserted into the bottom part and that has contour elements, whereby the respective contour elements are heatable and where the upper part is equipped with ventilation openings. This first enables a suitable preparation of the charged material by suitable adjustment of the moisture content to 2 to 4%, whereupon the material prepared accordingly is then fed to the press and is here simultaneously heated and compressed by the correspondingly heated contour elements. In this way the compression or recycling process can be made more uniform and safe so that, as already mentioned, starting products containing decontaminations also can be used without problems. It is even possible that the content of aluminum foil cuttings, for example, or comminuted aluminum chips is increased, or that even such a content is provided, which influences the capability of the pre-product for heat conductance and thus shorter process times. These foreign parts, together with the moisture, result in an advantageous uniformity of the overall compression process, as well as the processing itself.

Further optimization is achieved with an installation that provides, in addition to the known components, that the mixing device is associated with several flanges with branching conveyors, that the branching conveyors have admixture valves for the catalyst, and that the branching conveyors are followed by turntables with integrated molds, a filling station, a press station, and a transfer station. This makes it possible to produce, with a cutting mill and a mixing device, a large number of molded parts almost continuously, whereby the mixing device simultaneously charges several branching conveyors via corresponding flanges and the mixed product is fed to the turntables, and thus to the molds during the addition of the catalyst. These turntables hold, among other things, the press station where the molds, and thus the filled-in polyurethane foam, binder, catalyst, and other substance mixtures, can be effectively molded and can also be kept in this mold. Because of the relatively short path on or in the turntables, the heating power that must be applied is relatively low, especially since, due to a preheater and a reheater, a heating of the press station is not necessary. By separating the individual pressing and heating processes, the corresponding aggregates can be realized in a much more simplified form.

If it is useful, due to the product used, that an extended reheating station is provided, it is possible, according to the invention, that the turntables be equipped with a bypass into which a tunnel furnace with small dimensions or in small dimensions has been integrated. The individual molds pass through the bypass and the tunnel furnace, they are heated or kept hot there correspondingly, and they are opened and emptied at the end of the tunnel furnace. It is then possible to perform, after a suitable cleaning of the molds, a corresponding preheating still in the tunnel furnace by utilizing the waste heat, so that the individual molds, upon reaching the filling station, again have the desired temperature for holding the mixed product and for the further transport following the closing of the molds.

The uniformity in the output of molded parts or boards that was already described before is ensured by designing all turntables so as to transfer from the side of the transfer station to a common conveyor belt, whereby the predefined cycle sequence ensures a tight juxtaposition and transport of the individual molded parts or boards.

The invention is particularly characterized in that it proposes a process and an installation with which a great variety of mixtures of rigid PU foam and similar materials can be recycled, whereby the resulting material is used to form molded parts and boards of various thicknesses (5 to 30 mm and more) which can be used for a variety of applications. It is hereby advantageous that a specific adjustment of the moisture content, catalyst, mixing-in conditions, e.g. of paper, and other factors, such as temperature and pressure, work together to make available a process that enables a safe process control, so that molded parts that can be reproduced flawlessly can be produced. These molded parts have a smooth surface, and a high stability and elasticity, so that they can be used advantageously for a variety of applications. It is optimal if an installation whose characteristics ensure a safe performance of the process is associated with the process. An almost continuous operation is ensured.

Other details and advantages of the object of the invention are found in the following description of the pertinent drawing that shows preferred embodiments with the necessary details and parts.

DETAILED DESCRIPTION OF THE DRAWINGS

Figure 1:
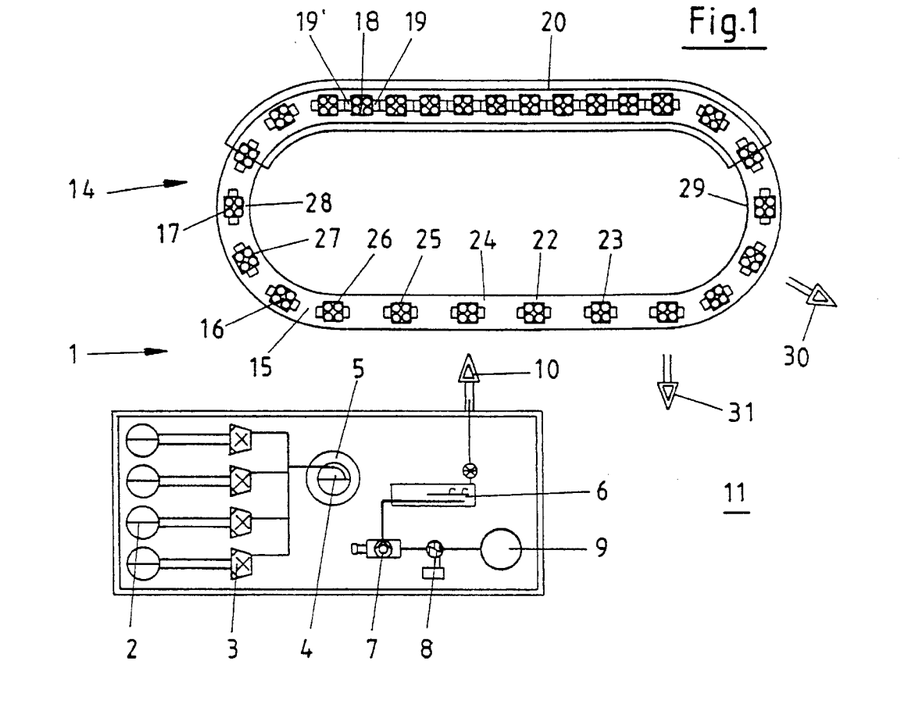
FIG. 1 shows an approximately continuously working installation for the recycling of PU foam.

FIG. 1 shows a processing installation (1) that is first equipped with several daily silos (2). Here the starting product is stored and is fed as needed to a comminution unit, preferably a cutting mill (3), and it is then stored in the intermediate bunker (4). In the design shown in FIG. 1, this intermediate bunker (4) can be combined with a drying device 5 so that the material here can be brought specifically prior to the mixing (injection) with the isocyanate to a moisture of 2 to 4% (−10%).

From the intermediate bunker (4), the starting product that has been brought accordingly to a uniform moisture is fed to the mixing device (6). A corresponding mixing device with a screw enables a uniform application of the isocyanate via the metering pump (7) to which the isocyanate is fed from the daily container (8) or the large tank (9). The isocyanate is applied to the starting product moving inside the mixing device (7) via the metering pump (7), e.g. with high pressure, preferably 60 bar.

(1) designates the pre-product filling device that is here suggested only generally with an arrow, while the supply storage (11) is provided for storing the produced molded parts.

An important second part of the processing installation (1) is the molded part production device (14) in the form of a type of carousel. The conveyor belt that operates approximately in a circle or the carousel (15) is equipped with molds (16, 17, 18) that exhibit braked wheels, for example, so that they are carried along evenly by the conveyor belt (15) as long as they are not held fast by holding devices, e.g. in the tunnel furnace (20). Hereby the use of spacers (19, 19') ensures that the molds always have identical intervals between them.

(22) first designates the mold cleaning station that is preceded by the tool cleaning station (23). The suitably cleaned molding containers (16, 17, 18) are then passed under the filling station (24) so that an even filling of the bottom part with molding material or starting product is possible. At the next station, i.e. the so-called correction or supplementation station (25), an intermediate plate is inserted, for example, which is advantageously roughened on both sides. In the next work cycle the upper mold can then also be filled with molding material, whereupon the cover plate is added on top at the next correction and supplementation station (27). Also conceivable are multi-story boxes.

The molds (16, 17, 18) are closed at the molding container closing station (28) and are then locked.

Then the molds (16, 17, 18) filled with compressed molding material reach the tunnel furnace (20). Here the individual molds (16, 17, 18) stack against each other, whereby, as already mentioned, an even interval is ensured via spacers (19). Holding devices (not shown here) make it possible for the individual molds (16, 17, 18) to pass through the tunnel furnace (20) in the closest possible interval.

Upon leaving the tunnel furnace, the molds (16, 17, 18) are then again separated so that they can be unlocked in the cycle at the molding container unlocking station (29) and can be divided at the strip-down station (30), so that the individual molded parts can be removed at the molded part removal station (31). As already mentioned before, they are then transported to the supply storage (11) and are stored there until they can be processed.

Figure 2:
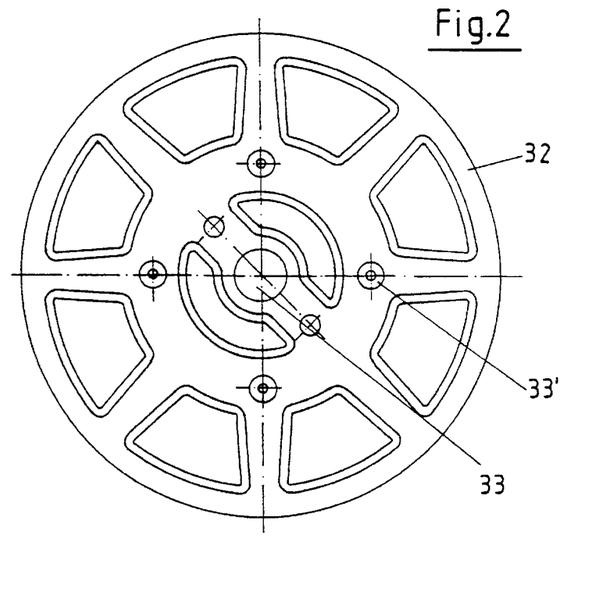
FIG. 2 shows a top view of a molded part of recycled PU foam.
Figure 3:
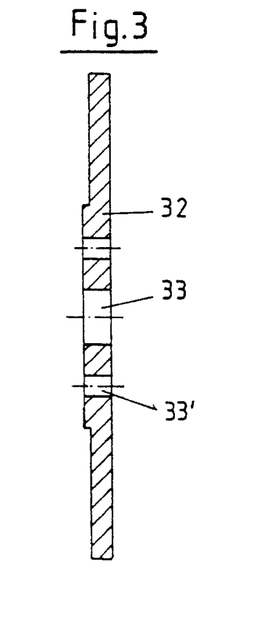
FIG. 3 shows a cross-section through the molded part according to FIG. 2.

Such a molded part (32) is shown as an example in FIGS. 2 and 3, whereby it is clear that very complicated molded parts can be produced in such a mold (16, 17, 18). They have not only corresponding bores or recesses (33, 33'), but also corresponding edges and curves.

Figure 4:
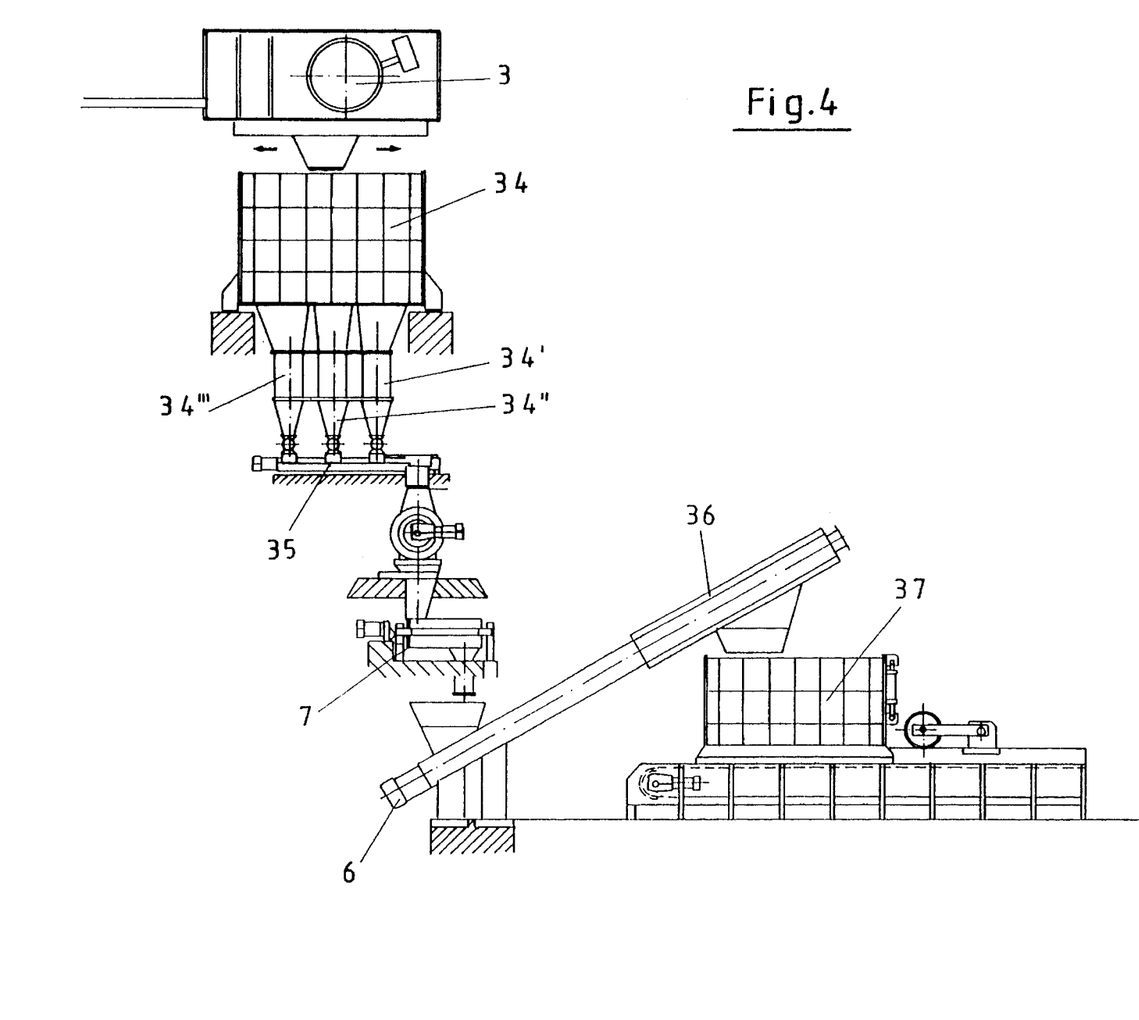
FIG. 4 shows a different design of the installation for processing recycled PU foam.

FIG. 4 shows an installation in which molded parts (32) are produced in a discontinuous process. As already mentioned above, the starting product is first brought in the cutting mill (3) or a similar comminution tool to a uniform grain size, whereby the rod part shall be approximately 30%. In the presorting bunker (34), a certain presorting then takes place, i.e. suitable material is kept in partial bunkers (34', 34'', 34''') and is then removed via a metering screw (35) and is supplied to the further process. (7) designates the metering pump through which the isocyanate or other binder is added before the suitably wet product to which the isocyanate has been added, i.e. the binder, reaches the mixing device (6), in this case a long mixing screw. This mixing screw is combined with a dryer (36) at its top end, so that the material that is possibly still too moist is brought to a specific moisture content. It is useful, however, that this dryer (36) precedes the metering screw (35).

(37) stand for the press in its entirety, in which a discontinuous compression of the material is performed, whereupon this material leaves the press (37) again as a molded part (32) (not shown here).

Figure 5:
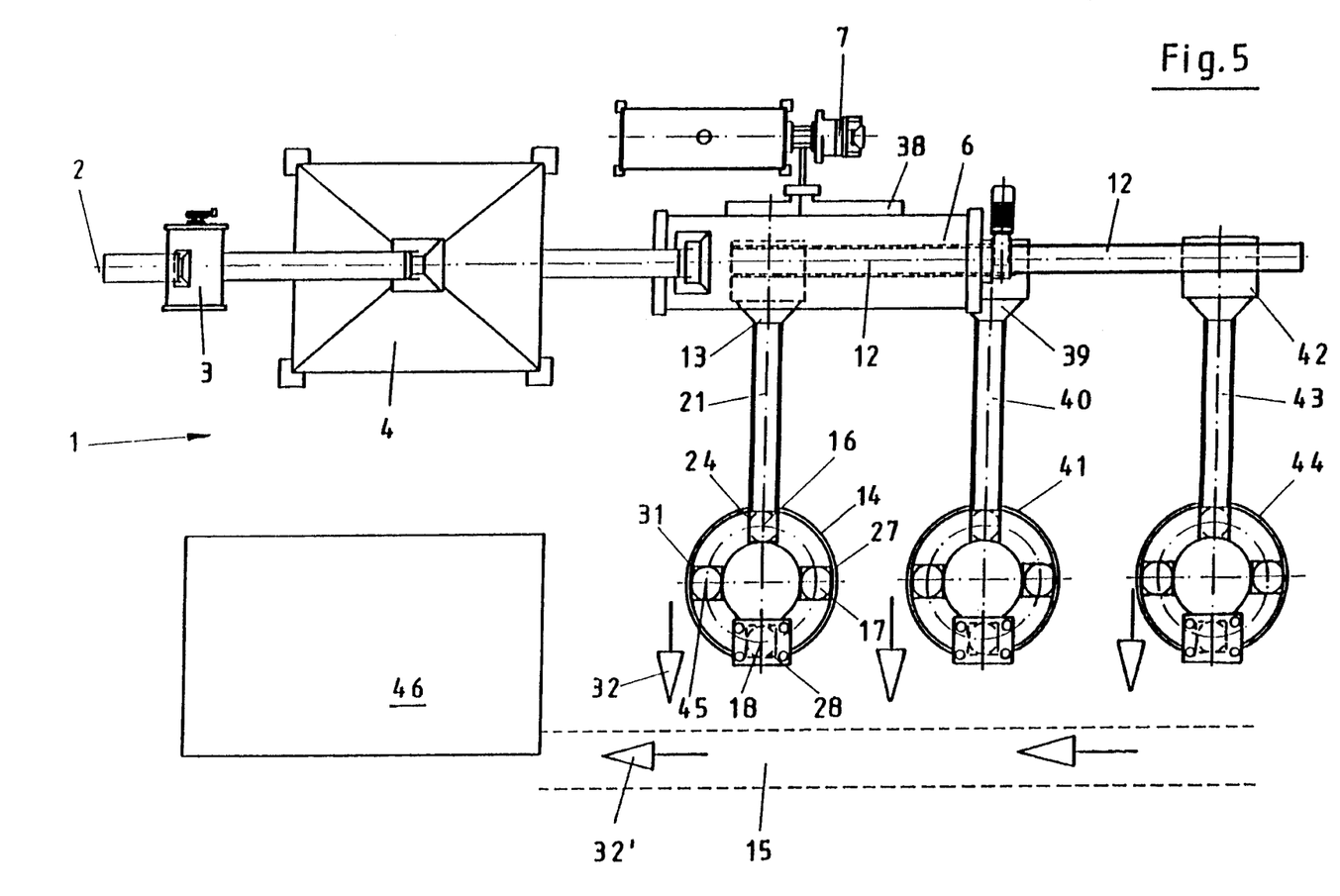
FIG. 5 shows an installation with several parallel turntables.

FIG. 5 shows a processing installation (1) in which the rigid polyurethane foam shall and can be recycled. From the daily silo (2) (not shown here) a corresponding starting product is fed to a cutting mill (3) in order to be cut or comminuted there to the desired particle size of below 5 mm. The intermediate bunker (4) in this case is a container that has a drain funnel which is not shown here.

Via the intermediate bunker (4), the starting product reaches a mixing device (6), where polyurethane adhesive is added and injected specifically and in the necessary or desired amount via a metering pump (7). Below the mixing device (6) runs a distribution conveyor (12) through which several branching conveyors (21, 40, 43) that are flanged to it via flanges (13, 39, 42) are supplied with the mixed product.

Connected to the branching conveyors (21, 40, 43) are turntables (14, 41, 44) on which or in which the further processing of the mixed product is performed before the end products fall onto the conveyor belt (15) and are fed from here to the storage place (46).

The individual turntables (14, 41, 44) are equipped with several molds (16, 17, 18) that are filled with mixed product and are then passed around the turntable (14, 41, 44) and influenced accordingly.

The molds (6) are first filled in the filling station (24) with the starting product, whereupon the two- or multi-part mold (16) is closed in order to be brought from here to the heating station (27). The heating station (27) may simultaneously also be the station where the molds are closed. In the area of the press station (28), the compression then takes place in the mold (here 18) to the desired thickness of 10–30 or more mm.

After leaving the press station (28), the molds (16, 17, 18) reach the unlocking station (31). Here the molded part (32) is transferred to the conveyor belt (15) and is then transported as a cooled or solidified molded part (32') to the storage place (46).

To achieve a uniform mixture of rigid polyurethane foam and other components and binder in the form of polyurethane adhesive, it is important that the polyurethane adhesive is added uniformly to the mixing device (6) via the metering pump (7). The mixing device (6) hereby has a nozzle bar or nozzle system (38) that extends over a large part of the length of the mixing device (6), so that an early and simultaneous mixing of the starting product is possible.

Figure 6:
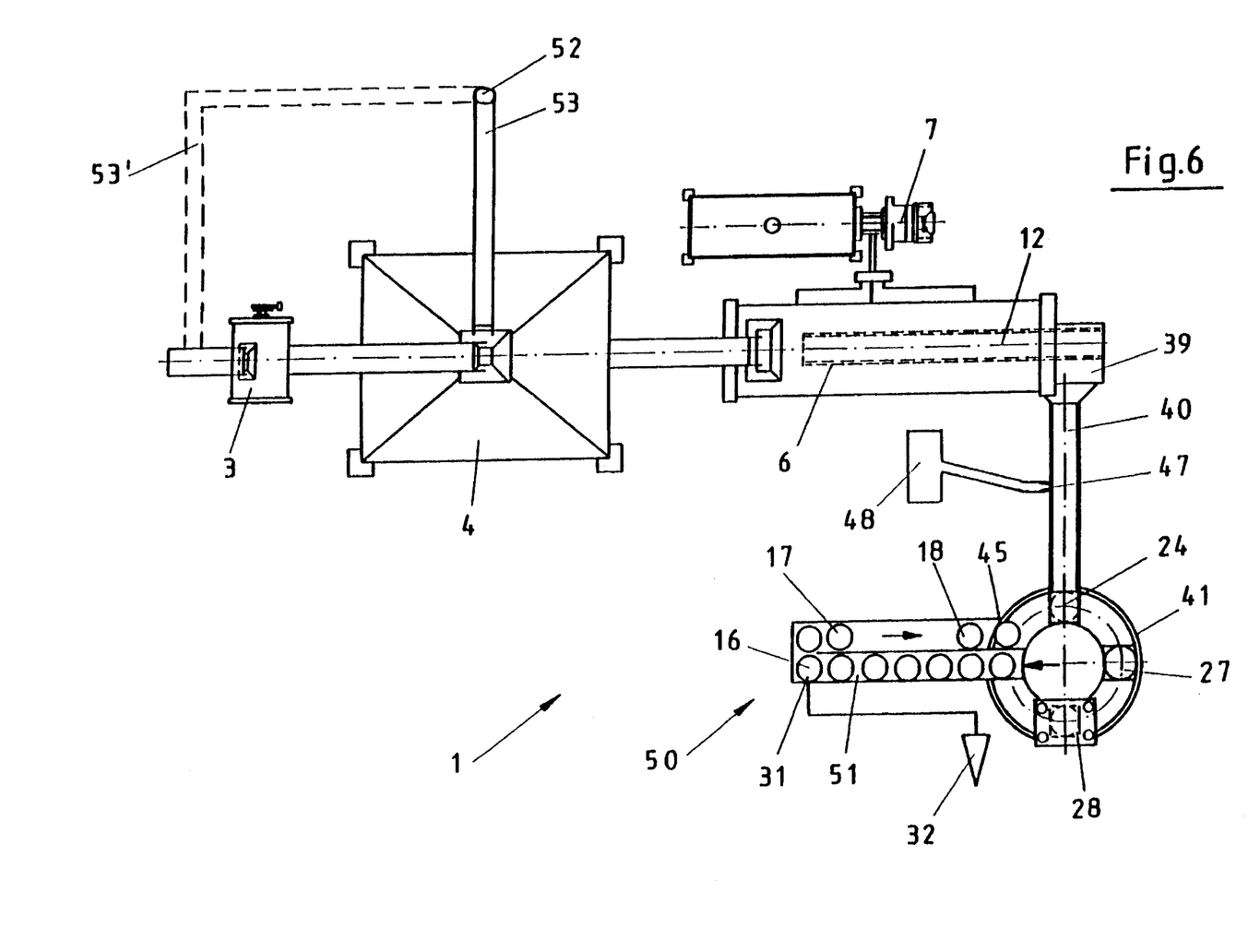
FIG. 6 shows an installation with catalyst and paper charger.

FIG. 6 corresponds to the drawing of FIG. 1, where the daily silo (2), the cutting mill (3), the intermediate bunker (4), the mixing device (6), and the metering pump (7) are concerned. Also suggested here is the distribution conveyor (12) and the flange (39) over which the branching conveyor (40) is operated accordingly. As seen in FIG. 2, an admixture valve (47) is provided in the area of the branching conveyor (40), and through this admixture valve, the catalyst is drawn from the container (48) and is injected into or sprayed onto the mixed product. By designing and controlling the branching conveyor (40) suitably, the mixed product is mixed accordingly with the catalyst. It is useful that the container (48) is equipped with a metering pump for this purpose (not shown here).

In contrast to the drawing in FIG. 5, the turntable (41) here has a specially designed reheating station (45) assigned to it. The individual molds (16) are transported in the manner of a bypass (50) into a tunnel furnace (51), either on the turntable or after having been pulled off the turntable, and they are here subjected to the corresponding temperature of approximately 150° C. The materials that have been compressed accordingly in the press station (28) thus can be subjected to the necessary thermal influence, whereby the influencing time of 10–20 minutes, or even longer, can be varied by way of the transport speed of the individual molds (16, 17, 18).

In the area of the transfer station (31), the molds (16, 17, 18) are opened and the molded parts (32) are removed and transferred to the conveyor belt (15) which is not shown here. The opened molds (16, 17, 18) then have their temperature maintained during their further path through the tunnel furnace by exploiting the waste heat, or are again heated, cleaned and returned to the filling station (24).

The processing installation (1) shown in FIG. 6 may also be used advantageously for producing molded parts (32) of rigid polyurethane foam and other components, especially paper, for which purpose an addition funnel (52) is provided for suitably prepared paper. This paper is added via the conveyor belt (53) to the intermediate bunker (4), or to the conveyor belt (53') leading to the cutting mill (3). The latter has the advantage that a certain mixing then already takes place in the cutting mill, resulting in a uniform product which is then mixed further in the mixing device (6) and then has polyurethane adhesive or another binder added to it. It is then brought towards the turntable (14, 41, 44) and compressed. The amount of the added paper or added cellulose can be increased to up to 80% by way of the addition funnel (52) and the conveyor belt (53).

All mentioned characteristics, as well as those found only in the drawings, are considered as essential to the invention, both alone and in combination.

EXAMPLE

The following represents an exemplary formulation for the production of a flange with a diameter of 710 mm and a thickness of max. 42 mm.

The material intended for processing stems from the production of foam boards (edge clippings) and was delivered in briqueted form. It was first comminuted in the cutting mill (hole diameter 8 mm). Subsequent moisture determination showed 3.2%, so that no drying was required. The powder density of the dried granulate was determined to be 0.12 g/cm$^3$.

During screening analysis, the following particle size distribution spectra were determined:

| | |
|---|---|
| >4 | 0.4% |
| >3.15 | 2.4% |
| >2 | 13.8% |
| >1 | 37.8% |
| >0.5 | 21.1% |
| >0.5 | 24.5%. |

Non-PU components consisted of cuttings of paper and aluminum foil, as well as rubber and leather particles that were permitted for processing; particle size >3.15 or >4 mm. The available plough share mixer had a volume of 0.34 m$^3$. With a filling volume of 80%, that meant that max. 32.64 kg of pre-product were mixed. The charge was determined to be 30 kg, i.e. approximately 73% of the filling volume of the mixer. Then 28.5 kg of PU granulate was added to the mixer. The isocyanate injection time for a specific injection amount of 32 g/sec was calculated to be 46.875+2 to 3 sec, i.e. 49 sec. The isocyanate that was used was a Bayer PMDI from the daily container that was kept at 25° C. This isocyanate was added by the metering pump, which previously had been brought to operating temperature, at 60 bar feed pressure, to two single substance nozzles with a free diameter of 0.8 mm. The injection time of 49 sec was preselected on the pump control. After the isocyanate is injected, the pre-product is finished; but in the described case it remained in the mixture until further processing.

The tool for molding consists of an electrically heated bottom part with contour elements, an attachment for the bottom part as a pouring funnel for the pre-product, and an electrically heated top part with contour elements. The bottom part with attachment is located on the press bed, the top part is attached to the press ram. Attachment and top part are of a size so that the top part fits into the attachment with little play and forms in its deepest position a hollow space with the contour elements of the bottom part, said hollow space being the counter-contour of the flange.

The tool is in the open position, i.e. the press ram is driven up together with the top part. Preparation of the tool comprises the heating to the set temperature of 130° C., the control of mold cleanliness, and possibly cleaning of adhering residues, the application of spray as a releasing agent, and/or the insertion of melamine resin-saturated releasing paper. Process parameters in this case were presses with a constant pressure, set in advance. The pressing force was determined in the following manner:

The projected surface of the flange is 3,959.2 cm$^2$; the medium desired density is approximately 0.8 g/cm$^3$; a specific pressure of 3.5N/mm$^2$ is necessary for this purpose. The pressing force is calculated according to F=p×A=4N/mm$^2$×3,959.2 cm$^2$=1,584 kN, and was set by way of the pressure control of the press hydraulics.

The mass of the molded part is calculated first by conferring a high assumed mean density of the finished part of 0.9 g/cm$^3$, in order to choose the amount for the pre-product during the first use of the tool in such a way that difficulties during the unmolding which arise from a compression that is too low are avoided.

During the filling of the mold, the predefined amount of starting product is weighed, placed into the attachment of the bottom part, and distributed evenly. Now a sheet of releasing paper is placed on the starting product, and the actual molding process is ready to start.

The total time was determined for the highest thickness of the molded part, i.e. 42 mm, and was estimated to be 42 mm: 2=21 minutes, whereby it must be considered that with a lower compression (approximately 1:4.8 at the observed point), the pressing time should be chosen longer in order to ensure a safe unmolding. Accordingly, a total time of 30 minutes was determined for the first filling.

For the molding, the top part of the tool is driven down so that the pre-product is surrounded on all sides by the tool and is compressed, whereby the air contained in the loose bulk escapes. The time of the beginning pressure build-up in the hydraulic system is recorded for the consideration of the pressing time. With the chosen parameters, this point is reached when the top part is approximately 15 mm in front of the position it needs to reach. This is the start of the calculation of the pressing process that is associated with a gradual setting of the top part. After 17 to 18 minutes, the top part has reached its lowest position, and the press is hydraulically locked in its position.

If the total time for the molding has passed, the top part is driven up together with the attachment of the bottom part, the molded part is removed and is stored in a suitable manner, since there is tendency for distortion, especially immediately following the unmolding, until the hardening is completed. In the case of the described flange, a plane storage place is sufficient, and the temperature of the molded part must be considered. The time until final stability is reached is estimated to be approximately 24 hours for cooling in calm air; it depends on the process parameters; longer pressing and slower cooling or hardening at increased temperatures in the furnace result in a shorter time period.

In this example, an excess thickness of 9 mm was determined during the first pressing. This can be remedied by increasing the pressing force or, as in the example, by a proportional reduction of the starting product amount, which was chosen very high to start out with. The average thickness of the flange according to the drawing is approximately 30 mm, i.e. it was 39 mm after the first pressing; the starting product amount therefore must be reduced to 7,582 g. During the second pressing, 7,600 g of starting product were used, and dimensional stability was achieved.

This example relates to the discontinuous process. An example for the process with the tunnel furnace would result in much shorter cycle times and a higher continuity.

We claim:

1. A method of recycling rigid polyurethane foam and producing molded pieces of pretreated rigid foam, comprising the steps of comminuting a starting product to greater than zero but less than about 10 mm, drying the starting product to approximately 2 to 4% residual moisture, mixing a binder with the starting product, filling multi-part molds with the mixed starting product and binder, locking and pressing the molds together by generating compression pressure, compressing the molds at greater than ambient but less than or equal to approximately $20N/mm^2$ while maintaining ventilation passages, heating the molds externally until the molds reach temperatures between approximately 80° and 180° C., keeping the molds closed for a predetermined holding time, and releasing molded pieces from the molds.

2. The method of claim 1, wherein the binder is polyurethane adhesive.

3. The method of claim 1, further comprising comminuting the starting product to approximately 2 to 4 mm while maintaining a dust portion of approximately 30%, mixing the starting product with isocyanate applied in a spray mist format a rate of 8 to 40 g/sec, and filling the multi-part molds with the starting product mixed with the isocyanate into molded pieces.

4. The method of claim 1, wherein the compression pressure in the molds are continuously brought to between 12 and $20N/mm^2$, and wherein the molds are unlocked under pressure.

5. The method of claim 1, further comprising mixing the starting product with aggregates during comminution.

6. The method of claim 5, wherein the aggregates are selected from the group consisting of PVC granulate, cable trash, cellulose in a paper form, and cellulose in a cardboard form, the paper form and the cardboard form having a cellulose content greater than zero but not exceeding 80%.

7. The method of claim 1, further comprising adding a catalyst to the starting product.

8. The method of claim 7, further comprising preheating the catalyst and the binder prior to mixing the catalyst and the binder with the starting product.

9. The method of claim 7, wherein the catalyst is an accelerator.

10. The method of claim 1, wherein heating the molds further comprises passing the molds through a furnace and heating the molds to approximately 130° C.

11. The method of claim 10, wherein the furnace is divided into at least two zones to shorten passage times, and wherein the furnace has a temperature above a desired temperature value for the mold to facilitate a fast heat transfer.

12. A method of recycling rigid polyurethane foam and producing molded pieces of pretreated rigid foam, comprising the steps of comminuting a starting product to less than about 4 mm but greater than 0 mm, drying the starting product to approximately 2 to 4% residual moisture, filling starting product in multi-part molds defining molded pieces, compressing the molds in a compression phase with approximately 2.5 to $5N/mm^2$ of pressure, maintaining the pressure for a predetermined holding time, heating the multi-part molds during the set holding time to a temperature not less than 80° and not greater than 180° C., and removing molded pieces from the molds.

13. The method of claim 12, further comprising adding a catalyst to the starting product.

14. The method of claim 13, wherein the catalyst is an accelerator.

15. An apparatus for processing rigid polyurethane foam, comprising a comminuting unit for receiving and pulverizing a starting product, an intermediate bunker for receiving and holding a pulverized starting product, a drying device combined with the intermediate bunker for drying the pulverized starting product, a mixing device for receiving a dried starting product and for mixing the dried starting product with a binder, and a molded part production device for molding a mixed starting product into a molded piece.

16. The apparatus of claim 15, wherein the molded part production device has a conveyor belt, molds attached to the conveyor belt, braked wheels on the molds for carrying the molds evenly along the conveyor belt, spacers between the molds to establish identical intervals between the molds, a mold cleaning station, a first filling station positioned after the mold cleaning station for filling bottom parts of the molds, a first correction station positioned after the first filling station for inserting intermediate plates in the molds, a second filling station positioned after the first correction station for filling upper parts of the molds, a second correction station positioned after the second filling station for positioning cover plates on the molds, a molding container closing station positioned after the second correction station for closing and locking the molds, a furnace positioned after the molding container closing station, the furnace having holding devices for guiding molds through the furnace at close intervals, a molding container unlocking station positioned after the furnace for unlocking the molds, a strip-down station positioned after the molding container unlocking station for dividing the molds, and a molded part removal station positioned after the strip-down station for removing molded pieces from the molds.

17. The apparatus of claim 16, further comprising a tool cleaning station positioned before the mold cleaning station.

18. The apparatus of claim 15, wherein the mixing device has a metering pump connected to a holding tank for applying the binder to the dried starting product.

19. The apparatus of claim 15, wherein the drying device is combined with the mixing device.

20. The apparatus of claim 15, wherein the intermediate bunker is a container having a drain funnel.

21. The apparatus of claim 15, wherein the molded part production device runs beneath the mixing device, the molded part production device further comprising a distribution conveyor, branching conveyors flanged from the distribution conveyor, turntables connected to the branching conveyors, the turntables being rotatable and having several molds for receiving the mixed product, the turntables further comprising a filling station for filling the molds with mixed starting product and for closing the molds, a heating station positioned after the filling station, a press station positioned after the heating station, and an unlocking station positioned after the press station.

22. The apparatus of claim 21, wherein the molds are closed in the heating station.

23. The apparatus of claim 21, further comprising a reheating station positioned after the press station, the reheating station having a tunnel furnace extending off of the turntable, and a transfer station positioned in the reheating station for removing molded pieces from the molds.

24. The apparatus of claim 21, further comprising admixture valves positioned near the branching conveyors for supplying catalysts to the mixed starting product.

25. The apparatus of claim 15, further comprising a storage place for storing the molded pieces, the storage place associated with the molded part production device by an exiting conveyor belt.

26. The apparatus of claim 15, wherein the mixing device has a nozzle system extending over a large portion of the mixing device.

27. The apparatus of claim 15, further comprising an addition funnel and an addition conveyor belt connecting the funnel to the intermediate bunker.

28. The apparatus of claim 15, further comprising an addition funnel and an addition conveyor belt connecting the funnel to the comminuting unit.

29. An apparatus for processing rigid polyurethane foam, comprising a comminuting unit, a presorting bunker for receiving a starting product from the comminuting unit, a metering screw connected to the bunker through which a sorted starting product is removed, a metering pump for receiving the sorted starting product and for adding a binder to the sorted starting product, a mixing device for receiving the mixed starting product from the metering pump, a drying device combined with the mixing device, and a press for receiving the dried starting product and for forming molded pieces.

30. The apparatus of claim 29, wherein the drying device is positioned before the metering screw.

31. The apparatus of claim 30, wherein the mixing device is a long mixing screw having a top end, and wherein the drying device is connected to the top end of the mixing screw.

* * * * *